United States Patent
Randall et al.

(10) Patent No.: US 7,151,359 B2
(45) Date of Patent: Dec. 19, 2006

(54) VARIABLE RELUCTANCE GENERATOR

(75) Inventors: Steven Paul Randall, Leeds (GB); Joseph Gerald Marcinkiewicz, St. Charles, MO (US)

(73) Assignee: Switched Reluctance Drives Limited, Harrogate (GB)

( * ) Notice: Subject to any disclaimer, the term of this patent is extended or adjusted under 35 U.S.C. 154(b) by 88 days.

(21) Appl. No.: 10/765,506

(22) Filed: Jan. 27, 2004

(65) Prior Publication Data

US 2004/0178774 A1  Sep. 16, 2004

(30) Foreign Application Priority Data

Jan. 27, 2003  (GB) ............................... 0301833.0

(51) Int. Cl.
*H02H 7/06* (2006.01)
*H02P 9/00* (2006.01)
*H02P 11/00* (2006.01)

(52) U.S. Cl. ............................ 322/20; 322/29; 322/32; 318/701

(58) Field of Classification Search ................. 322/20, 322/29, 32; 318/701
See application file for complete search history.

(56) References Cited

U.S. PATENT DOCUMENTS

| | | | | |
|---|---|---|---|---|
| 2,445,991 A | * | 7/1948 | Bedford | 322/19 |
| 2,453,187 A | * | 11/1948 | Blain | 192/143 |
| 2,792,547 A | * | 5/1957 | Horton et al. | 323/337 |
| 2,920,307 A | * | 1/1960 | Chernosky | 367/185 |
| 2,957,111 A | * | 10/1960 | Schaeve et al. | 361/165 |
| 3,184,628 A | * | 5/1965 | Hammerstrom et al. | 310/168 |
| 3,372,323 A | * | 3/1968 | Guyeska | 318/803 |
| 3,483,463 A | * | 12/1969 | Smith | 322/29 |
| 3,510,699 A | | 5/1970 | Fredrickson | 310/49 R |
| 3,740,629 A | * | 6/1973 | Kohlhagen | 318/138 |
| 3,760,205 A | * | 9/1973 | Imris | 310/168 |
| 3,783,358 A | * | 1/1974 | Krauer | 318/701 |
| 3,992,641 A | * | 11/1976 | Heinrich et al. | 310/168 |
| 4,025,960 A | * | 5/1977 | Gray et al. | 310/168 |
| 4,077,678 A | * | 3/1978 | Studer et al. | 310/90.5 |
| 4,096,624 A | * | 6/1978 | Gray et al. | 29/596 |
| 4,135,119 A | * | 1/1979 | Brosens | 318/128 |
| 4,347,543 A | * | 8/1982 | Frister et al. | 361/91.6 |
| 4,400,655 A | * | 8/1983 | Curtiss et al. | 318/729 |
| 4,417,194 A | * | 11/1983 | Curtiss et al. | 322/47 |

(Continued)

FOREIGN PATENT DOCUMENTS

EP  0 537 761 A2  4/1993

(Continued)

OTHER PUBLICATIONS

Lang, et al., "Power Optimal Excitation of Variable Reluctance Motors," Electric Machines and Electromechanics: An International Quarterly, 2:123-135, 1978.

(Continued)

*Primary Examiner*—Darren Schuberg
*Assistant Examiner*—Pedro J. Cuevas
(74) *Attorney, Agent, or Firm*—Haynes and Boone, LLP (57) ABSTRACT

A variable reluctance generator has phase windings and a bias winding. By controlling the excitation produced by the bias winding, the speed of the machine or the DC link, a power converter using only diodes can supply power to a DC bus. A method of operating a variable reluctance machine as a generator, the machine having at least one phase winding, includes creating a bias flux linking the or at least one phase winding, and limiting the phase voltage to a magnitude below that otherwise induced in the phase winding by the bias flux.

31 Claims, 12 Drawing Sheets

U.S. PATENT DOCUMENTS

| | | | |
|---|---|---|---|
| 4,469,997 A * | 9/1984 | Curtiss et al. | 318/729 |
| 4,670,696 A | 6/1987 | Byrne et al. | 318/701 |
| 4,835,408 A * | 5/1989 | Ray et al. | 307/24 |
| 4,943,760 A | 7/1990 | Byrne et al. | 318/701 |
| 4,959,605 A * | 9/1990 | Vaidya et al. | 322/10 |
| 4,975,608 A * | 12/1990 | Aspden | 310/114 |
| 5,039,932 A | 8/1991 | Belanger et al. | 322/32 |
| 5,168,203 A | 12/1992 | Tepavcevic | 318/701 |
| 5,451,821 A * | 9/1995 | Teter et al. | 310/26 |
| 5,731,649 A * | 3/1998 | Caamano | 310/216 |
| 5,780,997 A | 7/1998 | Sutrina et al. | 322/29 |
| 5,814,914 A * | 9/1998 | Caamano | 310/216 |
| 5,903,082 A * | 5/1999 | Caamano | 310/254 |
| 5,982,070 A * | 11/1999 | Caamano | 310/216 |
| 5,986,378 A * | 11/1999 | Caamano | 310/216 |
| 6,049,197 A * | 4/2000 | Caamano | 322/89 |
| 6,137,256 A * | 10/2000 | Morris | 318/701 |
| 6,154,013 A * | 11/2000 | Caamano | 322/89 |
| 6,259,233 B1 * | 7/2001 | Caamano | 322/89 |
| 6,407,466 B1 * | 6/2002 | Caamano | 290/52 |
| 6,566,764 B1 * | 5/2003 | Rebsdorf et al. | 290/44 |
| 6,664,680 B1 * | 12/2003 | Gabrys | 310/74 |
| 6,700,258 B1 * | 3/2004 | McMullen et al. | 310/90.5 |
| 6,856,038 B1 * | 2/2005 | Rebsdorf et al. | 290/44 |
| 6,856,040 B1 * | 2/2005 | Feddersen et al. | 290/44 |
| 6,933,625 B1 * | 8/2005 | Feddersen et al. | 290/44 |
| 7,015,595 B1 * | 3/2006 | Feddersen et al. | 290/44 |
| 7,015,672 B1 * | 3/2006 | Laurent et al. | 318/701 |
| 2004/0008003 A1 | 1/2004 | Turner | 318/701 |
| 2004/0178774 A1 * | 9/2004 | Randall et al. | 322/23 |
| 2005/0135651 A1 * | 6/2005 | Hakansson | 381/396 |

FOREIGN PATENT DOCUMENTS

| | | |
|---|---|---|
| EP | 0 564 067 A2 | 10/1993 |
| GB | 2167910 A | 6/1986 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

Radun, Arthur, "Generating with the Switched Reluctance Motor," IEEE 9th Applied Power Electronics Conference, Orlando, FL, 1994, pp. 41-47.

Pulle, D.W.J., "Performance of Split-Coil Switched Reluctance Drive," IEE Proceedings, Vo. 135, Pt. B, No. 6, Nov. 1998, pp. 318-323.

Torrey, David A., "Switched Reluctance Generators and Their Control," IEEE Transactions on Industrial Electronics, vol. 49, No. 1, Feb. 2002.

Copy of full search report for European Patent Application No. EP04250399, mailed on Jun. 7, 2004.

* cited by examiner

VARIABLE RELUCTANCE GENERATOR

CROSS-REFERENCE TO RELATED APPLICATION

The subject matter of this application is related to the subject matter of British Patent Application No. GB 0301833.0, filed Jan. 27, 2003, priority to which is claimed under 35 U.S.C. § 119 and which is incorporated herein by reference.

BACKGROUND OF THE INVENTION

1. Field of the Invention

The present invention generally relates to a reluctance machine operated as a generator. More particularly, embodiments of the present invention relate to the operation of a variable reluctance generator which is able to generate into a load without the use of active switches in its phase winding circuits.

2. Description of Related Art

Figure 1A:
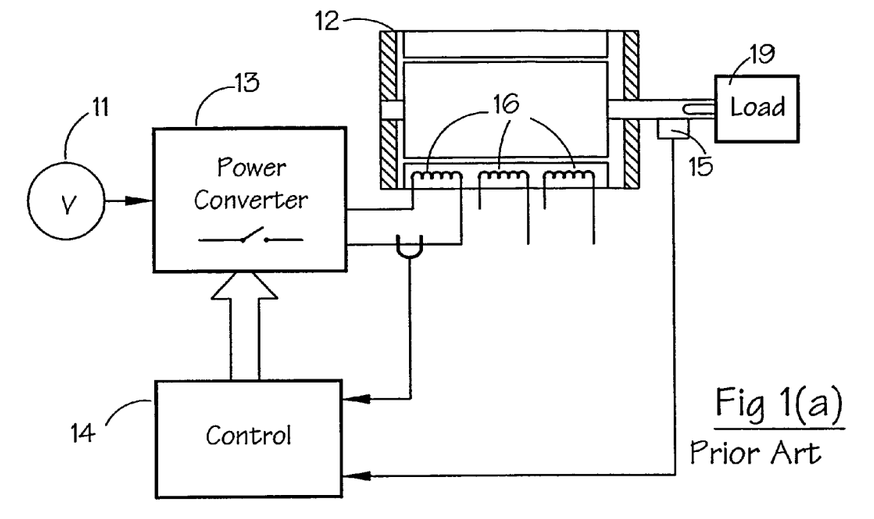
FIG. 1(a) is a schematic drawing of a prior art switched reluctance drive operating as a motor.

The characteristics and operation of switched reluctance systems are well known in the art and are described in, for example, "The characteristics, design and application of switched reluctance motors and drives" by Stephenson and Blake, PCIM'93, Nürnberg, 21–24 Jun. 1993, incorporated herein by reference. FIG. 1(a) shows a typical switched reluctance drive in schematic form, where the switched reluctance machine 12 is connected to a load 19. The DC power supply 11 can be rectified and filtered AC mains or a battery or some other form of electrical storage. The DC voltage provided by the power supply 11 is switched across the phase windings 16 of the machine 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal. The presence of the position detector and the use of an excitation strategy which is completely dependent on the instantaneous position of the rotor leads to these machines having the generic description of "rotor position switched".

Many different power converter topologies are known, several of which are discussed in the Stephenson paper cited above. One of the most common configurations is shown for a single phase of a polyphase system in FIG. 2, in which the phase winding 16 of the machine is connected in series with two active switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A low-value resistor 28 is connected in series with the lower switch to act as a simple current transducer. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

Figure 2:
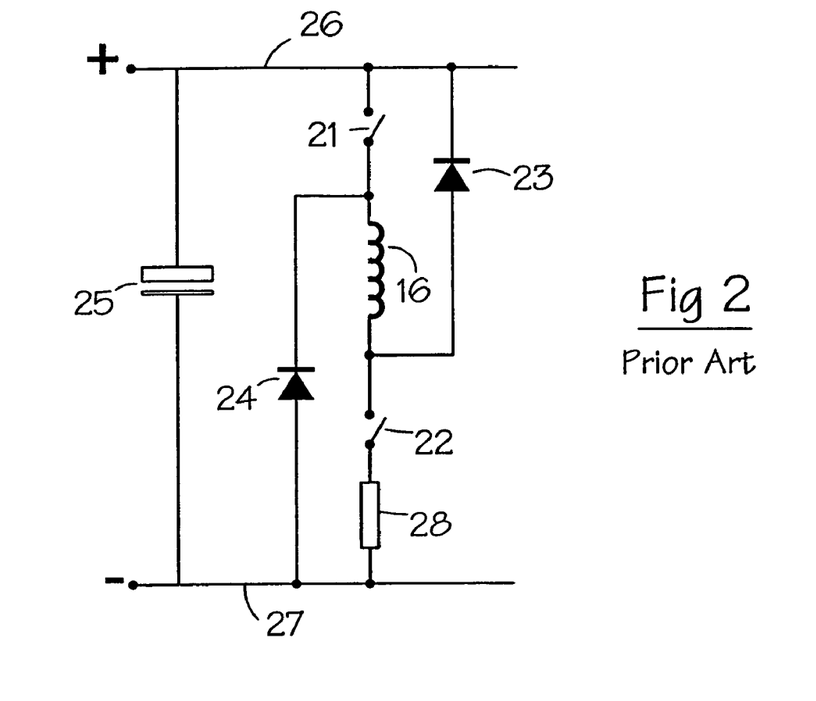
FIG. 2 is a prior art excitation circuit for the switched reluctance machine of FIG. 1(a) or (b)
Figure 3A:
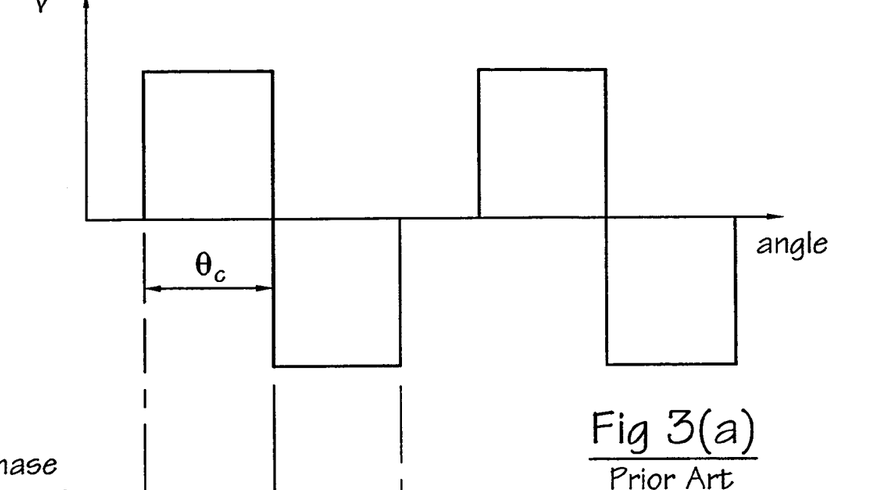
FIG. 3(a) is a phase voltage waveform for the circuit shown in FIG. 2.
Figure 3B:
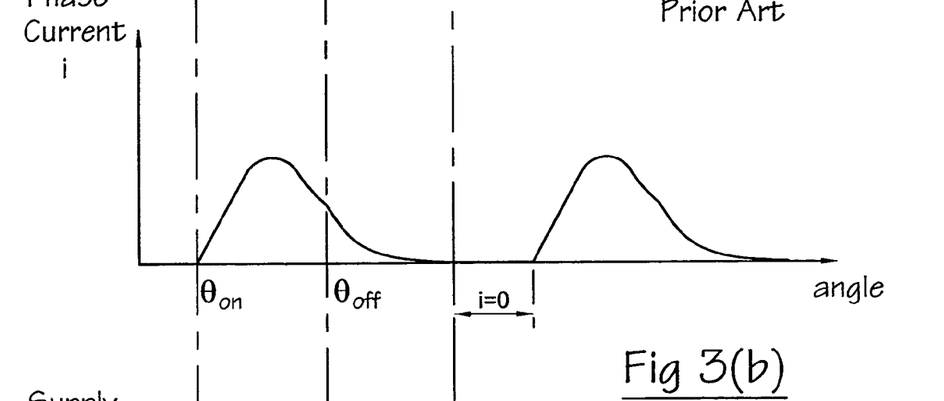
FIG. 3(b) is the phase current waveform corresponding to FIG. 3(a)
Figure 3C:
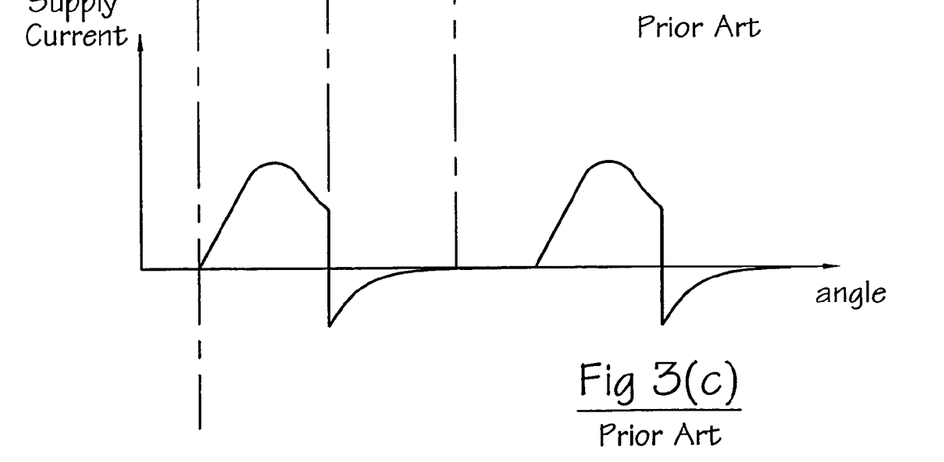
FIG. 3(c) is the supply current waveform corresponding to FIG. 3(a)

FIG. 3(a)–3(c) show typical waveforms for two operating cycles of the circuit shown in FIG. 2 when the machine is in the motoring mode. FIG. 3(a) shows the voltage being applied at the "on angle" $\theta_{on}$ for the duration of the conduction angle $\theta_c$ when the active switches 21 and 22 are closed. FIG. 3(b) shows the current in the phase winding 16 rising to a peak and then falling slightly. At the end of the conduction period, the "off angle" $\theta_{off}$ is reached, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

Figure 1B:
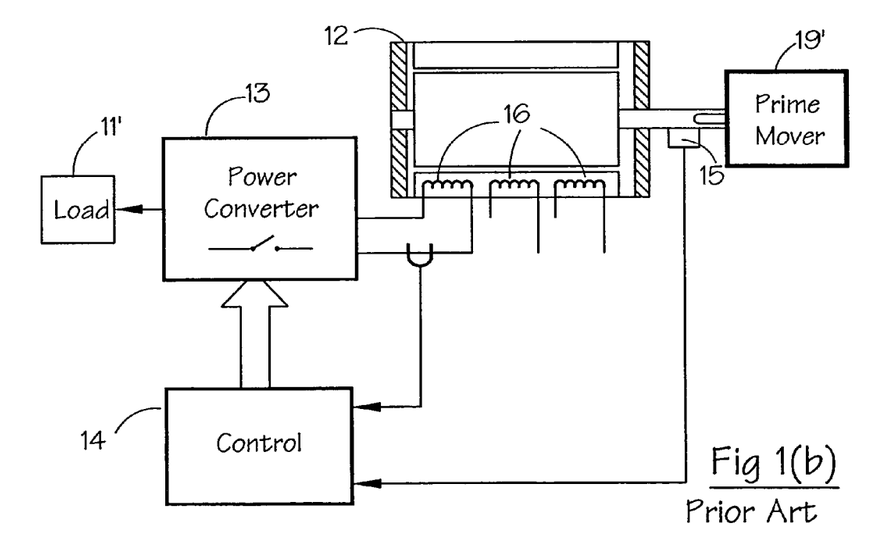
FIG. 1(b) is a schematic drawing of a prior art switched reluctance drive operating as a generator.
Figure 4A:
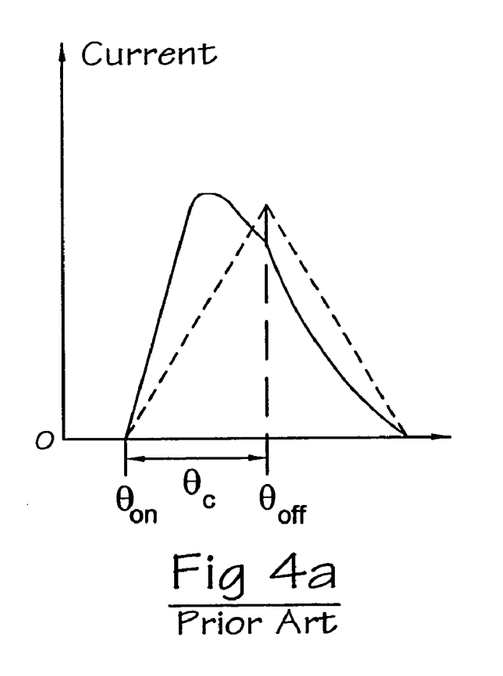
FIG. 4(a) and FIG. 4(b) show flux and current waveforms for motoring and generating respectively.
Figure 4B:
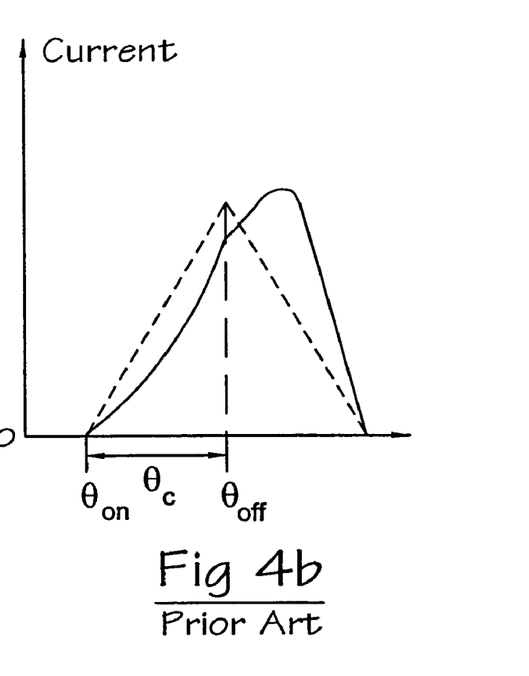

As is well known in the art, switched reluctance machines can be operated in the generating mode. A typical arrangement is shown in FIG. 1(b), where the load 19 of FIG. 1(a) becomes the prime mover 19', such as an internal combustion engine, supplying mechanical energy. The power supply 11 becomes an electrical load 11', accepting energy from the electrical machine 12 through the power converter 13. In general, the phase currents are mirror images (in time) of the phase currents in the motoring mode. Such systems are discussed in, for example, "Generating with the switched reluctance motor", Radun, Proceedings of the IEEE 9th Applied Power Electronics Conference, Orlando, Fla., 13–17 Feb. 1994, pp 41–47, incorporated herein by reference. FIG. 4(a) illustrates a flux waveform and the corresponding current waveform when the system is motoring and FIG. 4(b) illustrates the corresponding waveforms for generating. It will be seen from FIG. 4(b) that the machine requires a "priming" or magnetizing flux to be established (along with the necessary current to support this flux) before the energy is returned to the DC link. In other words, some electrical energy is required from the DC link to prime the machine before it is able to convert a larger amount of mechanical energy back to the DC link.

Though there are many topologies used for power converters for switched reluctance machines, all of them use a certain number of active switches, and these switches represent a significant portion of the cost of the converter. Considerable effort over many years has been put into reducing the number of switches per phase.

SUMMARY OF THE INVENTION

According to one embodiment of the invention useful electrical power is generated by a variable reluctance machine without actuating conventional power switches. A bias flux is introduced into the magnetic circuit, the magnitude of which flux varies with rotor position. Generation is achieved by limiting the phase voltage to a magnitude below that otherwise induced in the phase by the bias flux. Thus, a method and apparatus for generating electrical power is achieved either without active switches being present in the power converter of the machine, or with power switches present but that are not being actuated, and therefore effectively not present, while this mode is in operation.

The difference in flux between the bias flux and that associated with the limited voltage represents a flux that has to be supported by a current, which is caused to flow in the phase winding. Hence embodiments of the present invention generate electrical power in the or each phase of the machine. The phase voltage is optionally limited by a semiconductor device, such as a diode or diode bridge arrangement connected with the phase. In such a system the semiconductor device also serves to restrict the flow of current in the phase to one direction, thereby producing a usable rectified source of electrical power. Another device for limiting the phase voltage is a thyristor which is, of course, controllable as to the level at which it is commutated.

The flux in the magnetic circuit optionally is biased by means of one or more coils magnetically coupled to some or all of the phase windings of the machine. The excitation of the coil is optionally constant or variable. Another way of biasing the flux is to arrange a permanent magnet, or magnetizable element, in relation to the phase(s). The bias coil(s) or magnet is optionally located on the same member as the phase winding(s), typically the stator.

Embodiments of the invention have clear advantages in that they avoid the need to provide power switches in the way a conventional switched reluctance generator would require. The conventional power switches in a switched reluctance generator need not be present according to embodiments of the present invention. Alternatively, the mode of operation in accordance with embodiments of the present invention optionally is set up in a conventional switched reluctance drive system and used temporarily as one of a range of operating modes. For example, the drive for an electric vehicle or hybrid electric vehicle may include a switched reluctance drive as the, or part of the, prime mover. In such systems, the switched reluctance drive has been used both as a source of motive power and as a generator at appropriate times. Embodiments of the present invention allow the same drive to be used with the power switches simply rendered inactive, rather than not being present. This can lead to improved efficiency of operation.

In accordance with a particular form of the present invention there is provided a method of operating a variable reluctance machine as a generator, the machine having at least one phase winding, the method comprising: creating a bias flux linking the or at least one phase winding; and limiting the phase voltage to a magnitude below that otherwise induced in the phase winding by the bias flux.

Embodiments of the invention also extend to a variable reluctance machine having a first part with at least one phase winding and a second part which is arranged to move relative to the first part to generate electrical power; means for creating a bias flux linking the or at least one phase winding; and means for limiting the magnitude of the phase voltage below that otherwise induced in the phase winding by the bias flux.

The phase voltage may be limited initially to zero volts. This may be done conveniently with the use of diodes to limit the phase voltage as referred to above. Furthermore, the diodes also serve to restrict the flow of current in the phase to one direction, thereby providing rectified output electrical power. Such a diode may be part of a rectifier circuit providing, for example, full-wave rectification.

The output of the variable reluctance generator according to embodiments of the present invention optionally is controlled either by controlling the generator speed, the bias flux created in the at least one phase, or the voltage across the DC link.

BRIEF DESCRIPTION OF THE DRAWINGS

Other aspects and advantages of the invention will become apparent upon reading the following detailed description of exemplary embodiments of the invention and upon reference to the accompanying drawings, in which.

DETAILED DESCRIPTION OF PREFERRED EMBODIMENTS

Figure 5:
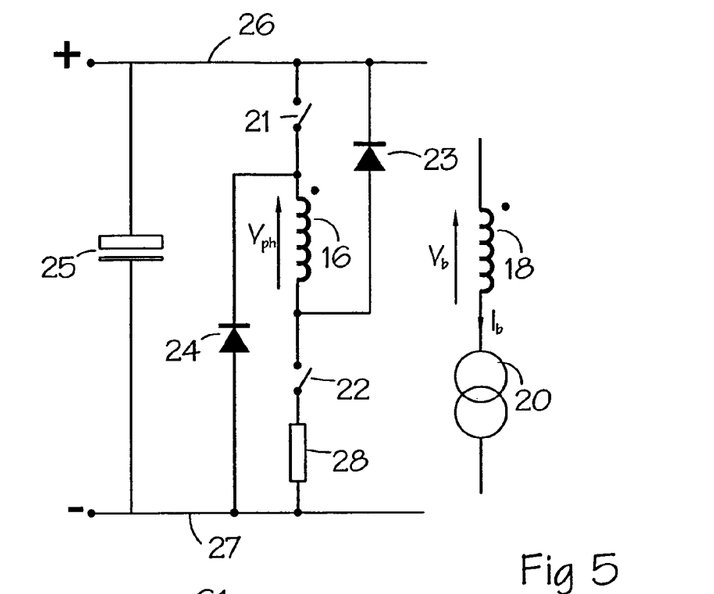
FIG. 5 shows generating system according to one embodiment of the invention.

FIG. 5 is a schematic diagram of one phase of a variable reluctance machine system according to one embodiment of the invention. The system may have only one phase or it may be polyphase. The components which are the same as in the prior art system of FIG. 2 are given the same numerals. In addition, the machine has a bias winding 18 fed by a constant current source 20. The magnetic polarity of the bias winding 18 with respect to the phase winding 16 is denoted by dots. The current in the bias winding is $I_b$, and the voltage, $V_b$, induced in it by the phase voltage, $V_{ph}$, by virtue of its magnetic coupling, is given by $$V_b = V_{ph} \cdot N_b / N_{ph} \qquad (1)$$

Where $N_b$ is the number of turns in the bias winding 18 and $N_{ph}$ is the number of turns in the phase winding 16.

Figures 6A, 6B:
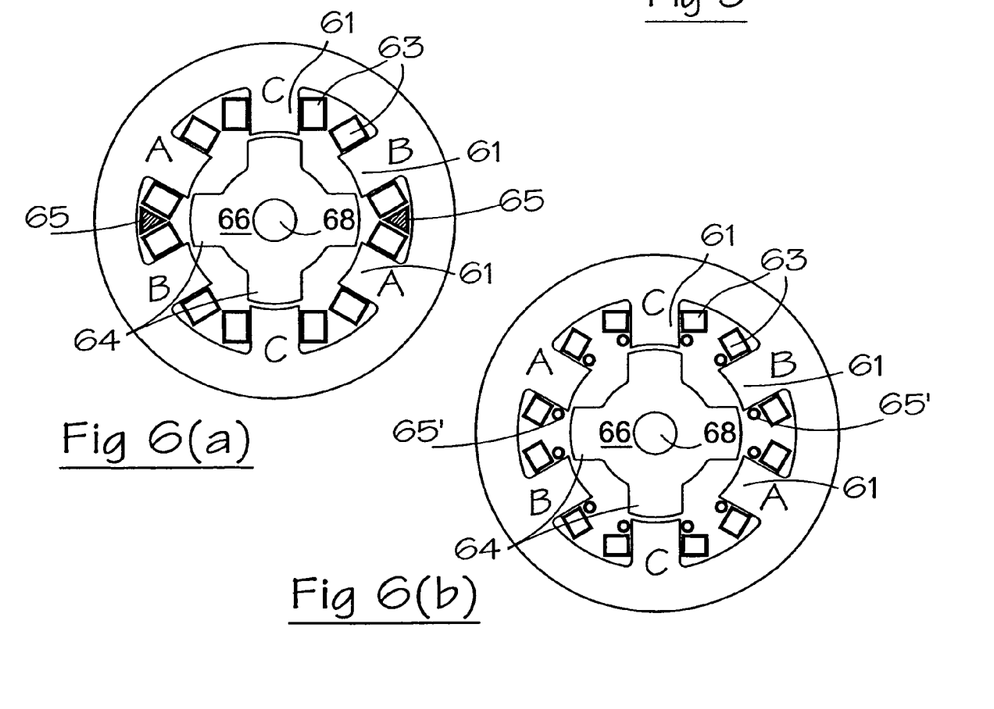
FIG. 6(a) shows a schematic view of the laminations and windings of a switched reluctance machine, according to an embodiment of the invention.
FIG. 6(b) shows a schematic view of the laminations and windings of another switched reluctance machine, according to an embodiment of the invention.

In physical terms, the bias winding may comprise a single winding spanning half an electrical pitch of the machine, as shown schematically in FIG. 6(a) for the example of a machine having six stator poles 61 and four rotor poles 64. A rotor 66 is mounted on a shaft 68 to rotate within the stator. The stator poles carry coils 63, which are connected in series or parallel to provide three phase windings, one of which is represented as 16 in FIG. 5. The bias winding 18 comprises a single coil 65 placed across the diameter of the machine, therefore embracing half the poles in a diametrically arranged loop.

Alternatively, as shown in FIG. 6(b), the bias winding may comprise multiple coils 65' on all, or at least some, of the poles, each embracing the pole in the same way as, but distinct from the coils 63 of the phase winding 16 on the same pole. The coils 65' are connected in series so that the current in each one is the same. In this case, the series connection of the six bias coils is the equivalent of the single coil 65 in FIG. 6(a).

It will be seen by inspection of the flux paths that these two arrangements are magnetically similar, and the choice between them would result from a consideration of such factors as size of the end-windings and the available space in the machine.

Other forms of bias winding may be used. For example, the winding may comprise gramme-ring type windings around the back-iron of the stator in which magneto motive force supporting the bias flux is applied around the back iron. In all cases, however, the bias winding sets up a flux from one half of the electrical pitch of the machine towards the other. For all these different bias winding arrangements the flux pattern at the air gap is the same. In a polyphase machine, the total flux will be essentially constant in magnitude for a constant bias current. As an alternative source of bias flux, a permanent magnet could be used in place of the bias winding 18, but such an arrangement would lack the flexibility of a wound coil in which the current can be controlled.

The operation of the machine will now be explained using the circuit of FIG. 5. To simplify the description, it will be assumed that the machine is magnetically linear. It is also assumed that the current source 20 is ideal in that it holds the bias current $I_b$ constant regardless of any voltage induced in the bias winding 18. The switches 21 and 22 are open.

Figure 7:
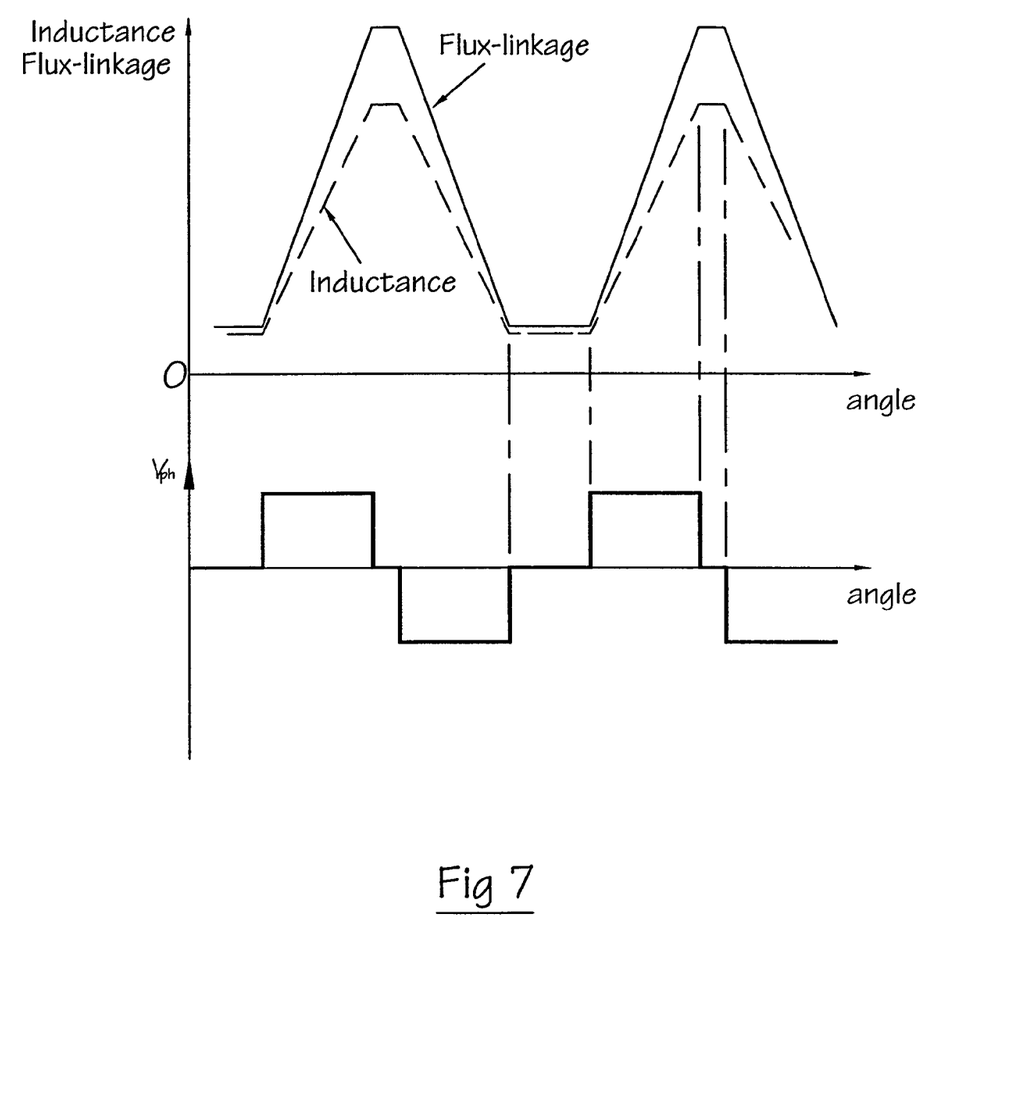
FIG. 7 shows inductance, flux-linkage and voltage waveforms corresponding to one embodiment of the invention.
Figure 8:
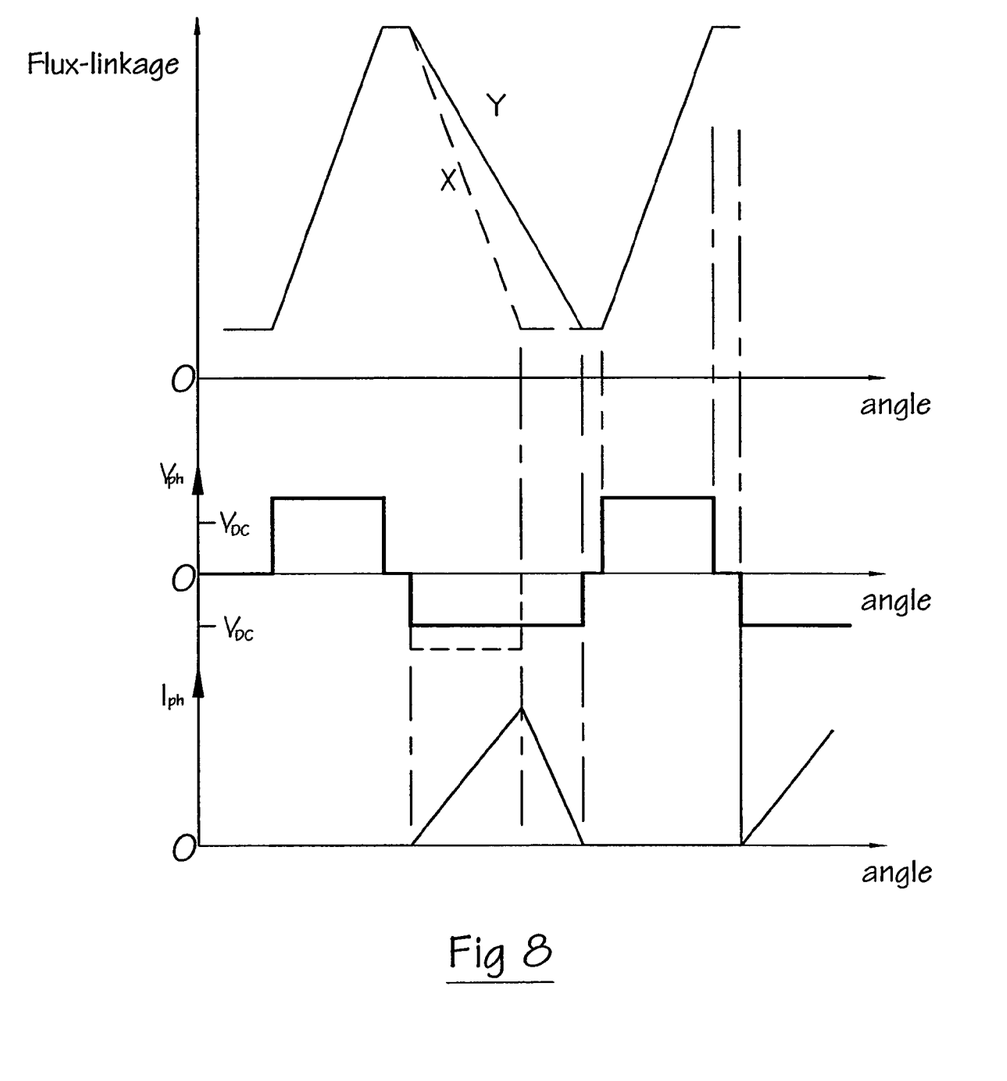
FIG. 8 shows flux-linkage, voltage and current waveforms corresponding to an embodiment of the invention.

The inductance profile of phase winding 16 is shown in FIG. 7. The profile is defined by the magnetic geometry of the laminations of the machine. Since inductance is defined as flux-linkage per amp of excitation, the flux in the phase winding is given by $$\psi_{ph} = L\, I_b \qquad (2)$$

and is shown in FIG. 7 for an arbitrary value of $I_b$. It follows that, for constant current $I_b$, the flux-linkage curve has the same form as the inductance. From Faraday's Law, the voltage induced in the phase winding is deduced as $$V_{ph} = d\psi_{ph}/dt = \omega\, d\psi_{ph}/d\theta \qquad (3)$$

where $\theta$ is the angular displacement of the rotor and $\omega$ is the speed, $d\theta/dt$. Since the slope of the inductance profile is piecewise linear, the induced voltage has the rectangular form shown in FIG. 7. The magnitude of the voltage, from Equations 2 and 3, is proportional to the speed and the bias current. As the voltage is increased, there comes a point where it equals the (constant) magnitude of the DC link voltage. By inspection of FIG. 5, the diodes 23,24 will become forward biased when the negative voltage excursion equals the DC link voltage, thus clamping the phase voltage. This is shown in FIG. 8. By Equation 3, the clamping of $V_{ph}$ clamps $d\psi_{ph}/dt$ to a shallower slope, as shown by line Y, than it would otherwise have had, as shown by line X. The difference in flux-linkage between the two lines represents a flux which has to be supported by a current flowing in the diodes, as shown. Note that the voltage waveforms and current waveforms are asymmetrical.

Figure 9A:
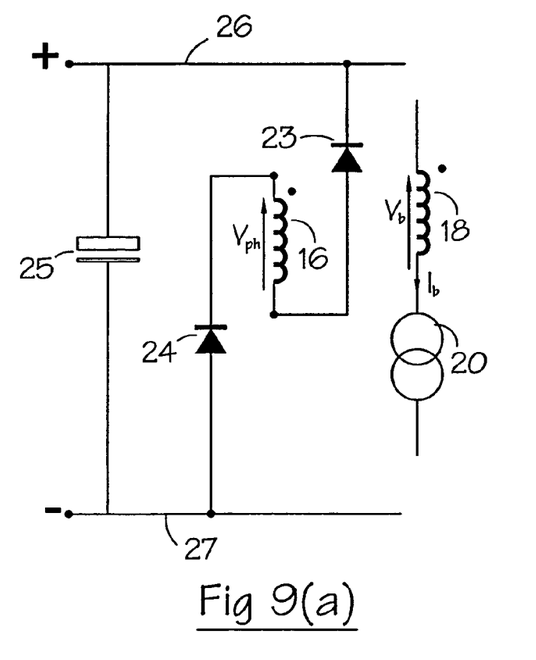
FIG. 9(a) shows a modification of the circuit of FIG. 5, according to an embodiment of the invention.
Figure 9B:
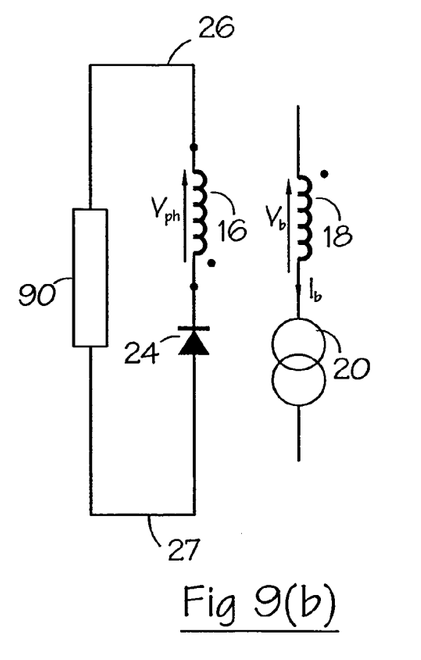
FIG. 9(b) shows a further modification of the circuit of FIG. 5, according to an embodiment of the invention.

Since the switches 21 and 22 are not used, the circuit optionally is simplified to that shown in FIG. 9(a) or 9(b) if the machine is not used in the motoring mode. This yields a power converter for a variable reluctance generator which has no active switches connecting it to the DC link. The DC link capacitor 25 may be replaced by a resistor 90 which simply dissipates the generated energy, allowing the system to be used as a brushless brake. In this case, the diodes clamp the negative excursion of the voltage to -IR, which is initially zero. Alternatively, the capacitor 25 optionally is replaced by a storage battery.

Figure 10:
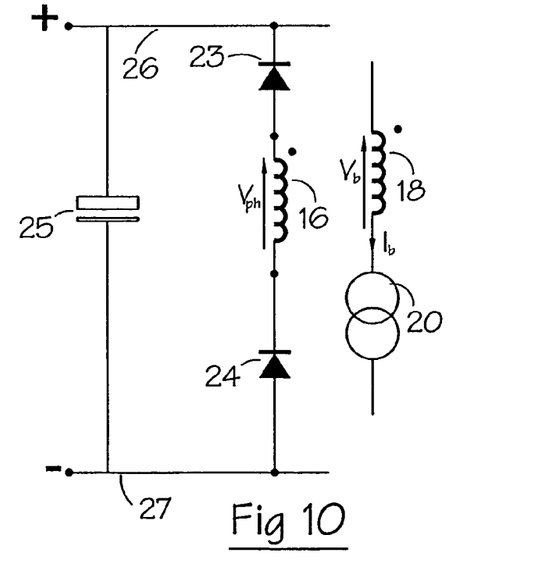
FIG. 10 shows a yet further modification of the circuit of FIG. 5, according to an embodiment of the invention.
Figure 11:
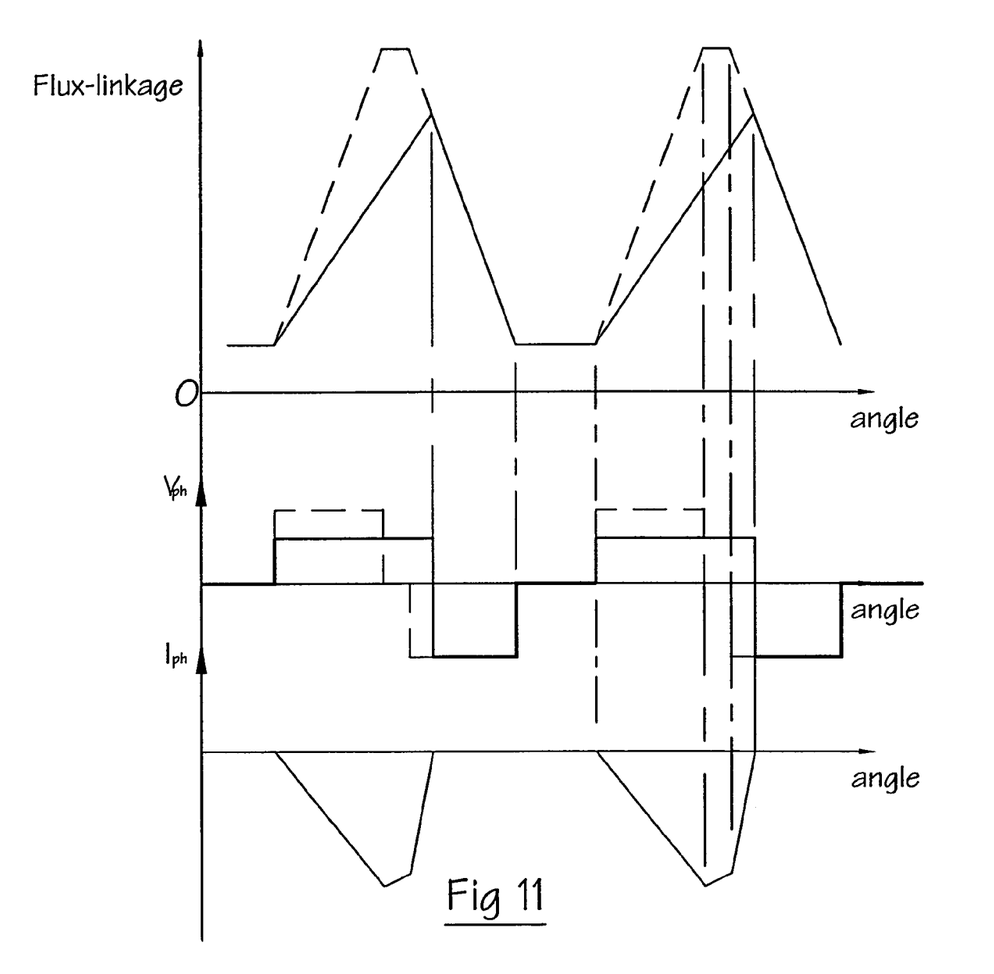
FIG. 11 shows a set of waveforms corresponding to the operation of FIG. 10, according to an embodiment of the invention.

In another embodiment of the invention, shown in FIG. 10, the diodes 23 and 24 are reconnected to replace the switches 21 and 22. As before, one or the other of the diodes optionally is deleted. This embodiment clamps the positive-going voltage excursion to the DC link voltage, so the gradient of the increasing flux is modified, as shown in FIG. 11. In this case, the flux linkage is reduced from what it would otherwise be, so the current flowing is in the opposite direction in the phase winding. Because the new flux linkage line falls underneath the dead zone of the inductance profile, the shape of the current is different from that described earlier.

Figure 12:
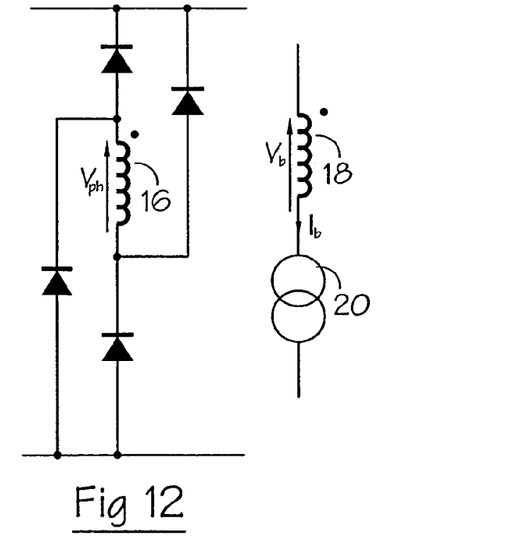
FIG. 12 shows a circuit combining elements of FIGS. 9(a) and 10, according to an embodiment of the invention.

It is possible to combine the currents of FIG. 8 and FIG. 11 by using four diodes connected as in FIG. 12. These are effectively connected in the form of a single-phase bridge, so it would be possible to use a standard component package for this duty.

Figure 13:
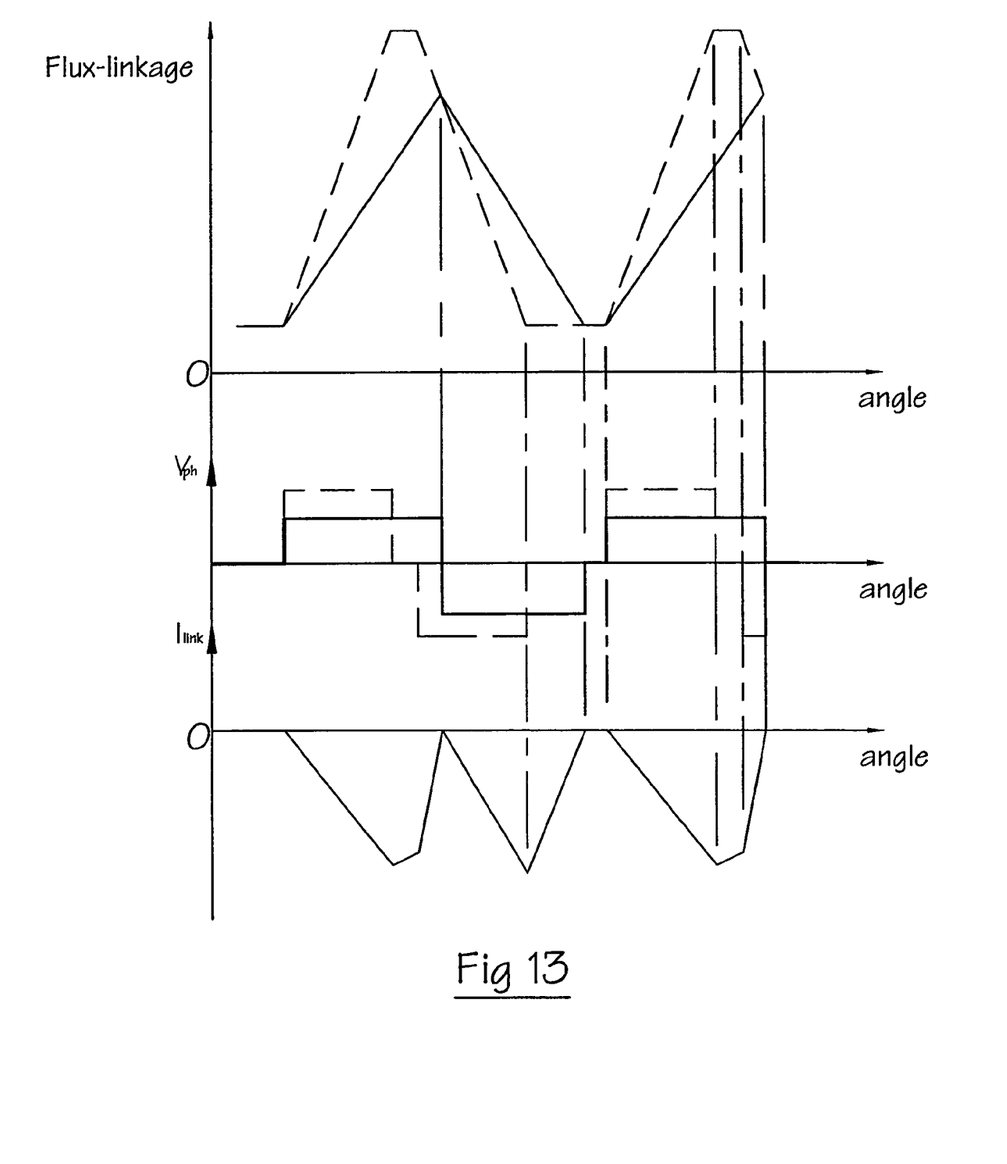
FIGS. 13–15 show sets of waveforms corresponding to the operation of FIG. 12 according to different operating conditions, according to embodiments of the invention.
Figure 14:
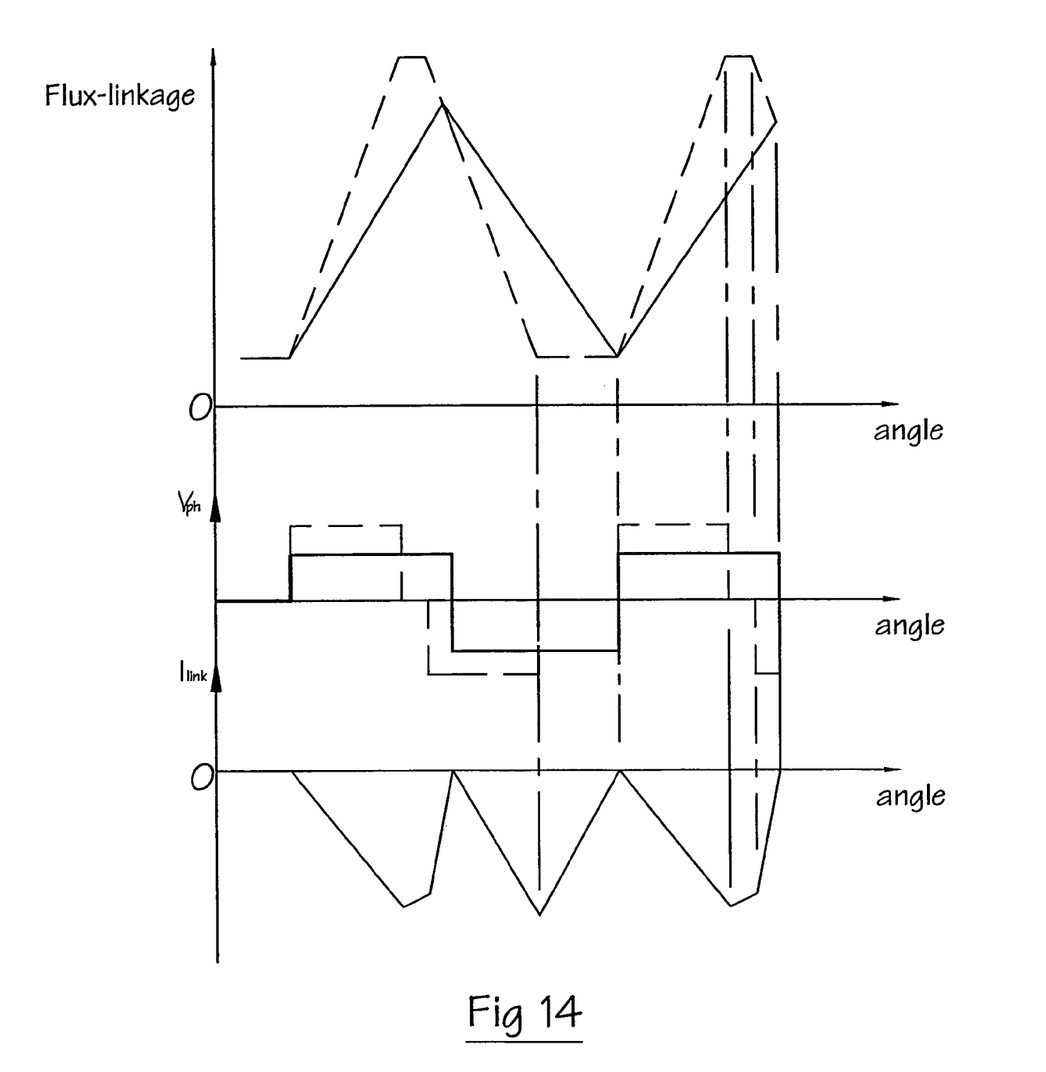

FIG. 13 shows the current waveforms of FIGS. 8 and 11 combined to give the current flowing in the DC link. It will be noted that the action of combining the currents delays the start of current from FIG. 8, and that the composite waveform is discontinuous in part of the minimum inductance region. As the bias current or the speed is increased or the DC link voltage is decreased, there comes a point, shown in FIG. 14, beyond which current is always supplied from one or other pair of diodes.

Figure 15:
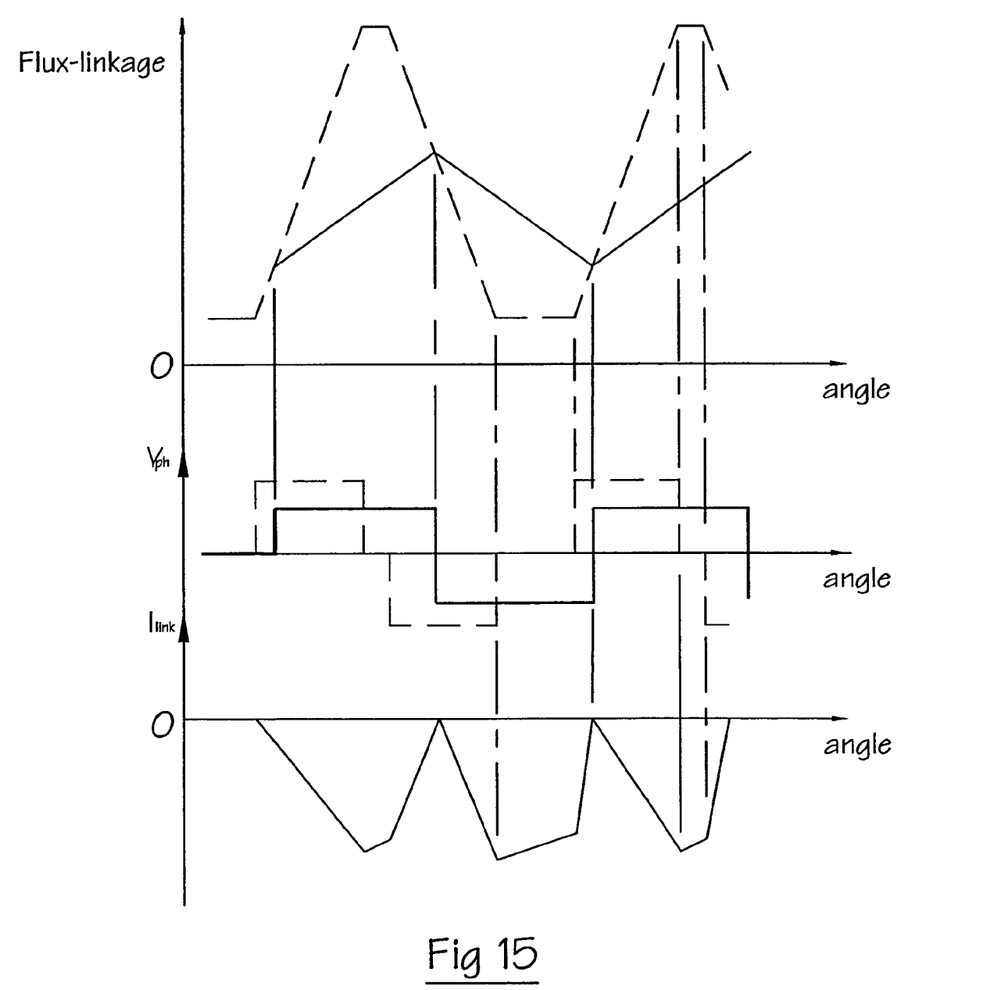

A further increase in excitation or speed or further reduction of the DC link voltage brings the machine into a new operating mode, which it enters through a transient state. In this respect, it is akin to the continuous current mode of conventional switched reluctance drive systems as disclosed in EP 0537761A which is incorporated herein by reference. When a steady state has been reached, as shown in FIG. 15 for an ideal system neglecting resistance, the length of time the flux takes to increase is exactly matched by the length of time taken to decrease and the locus of the point of change from increasing to decreasing follows the original flux linkage decrease. Since the slopes of increase and decrease are identical, the operating point is defined for any excitation level. Note that the two diode currents are still, in general, unequal, since the inductance profile is not symmetrical about a horizontal axis. This mode is inherently stable, since any perturbation will drive the increasing flux-linkage line to a smaller value and the decreasing flux-linkage line to a larger value, thus stabilizing the system.

It will be noted that the system described above has no need of shaft position information, since the diodes self-commutate when the currents fall to zero. This represents a further cost saving. It will be noted that in the embodiments shown there is no connection between the bias winding and the phase windings of the machine, i.e. there is galvanic isolation between them. This may be a significant safety benefit.

Figure 16A:
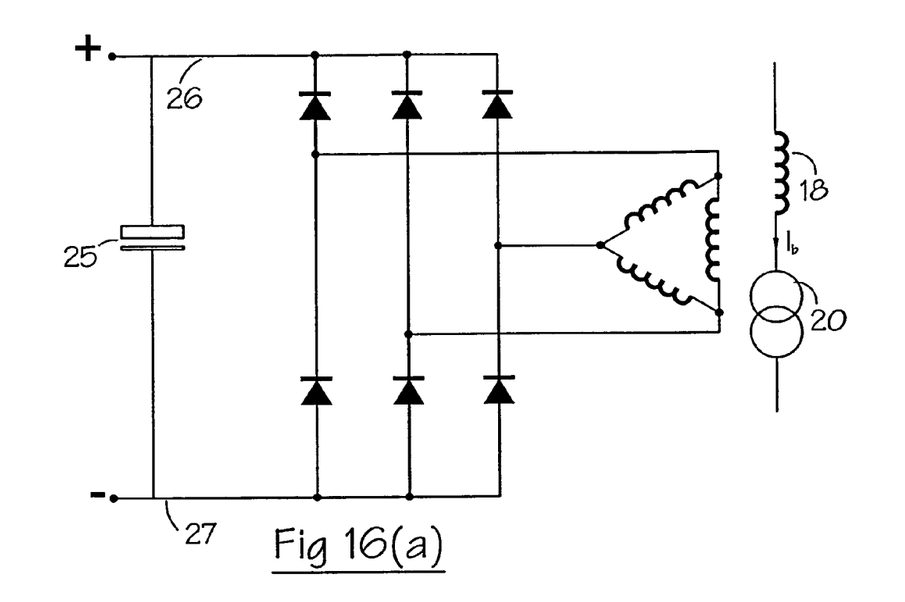
FIGS. 16(a) and (b) show delta and star connections of a variable reluctance generator according to an embodiment of the invention.
Figure 16B:
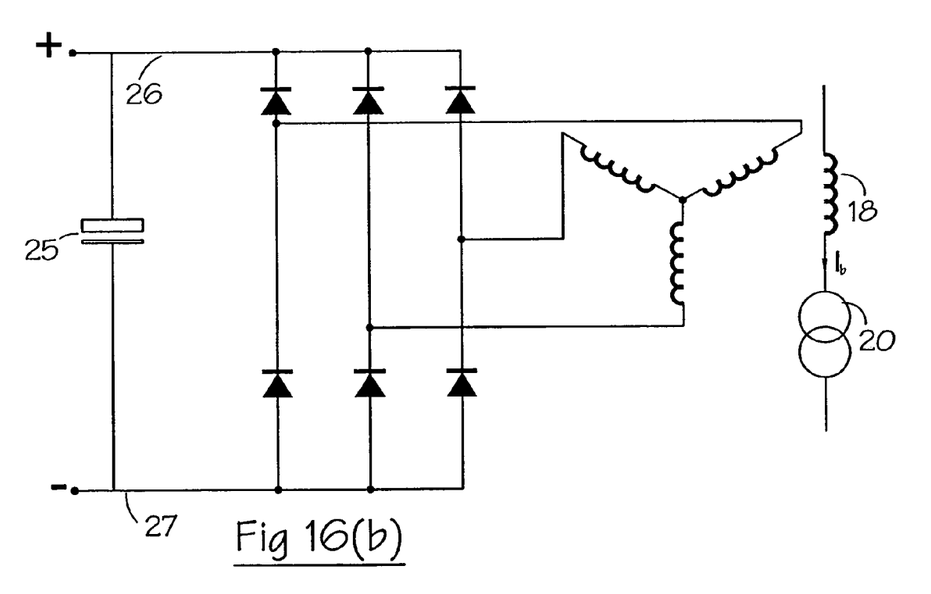

It will be appreciated that, while a single phase of a system has been used for illustration above, this is purely exemplary and the principles outlined above apply to any number of phases and any combination of numbers of stator and rotor poles. Where the system has three or more phases, alternative connections to the DC link are possible. For example, for a three-phase system, delta or star (wye) connections are possible, as shown in FIG. 16(a) and (b) respectively. Because the phase voltages are not symmetrical, the phase voltages in the delta connection only sum to zero under certain special conditions, so in general a circulating current will be present in the delta to compensate. Similarly, since the currents are not symmetrical, the phase currents in the star connection will only be equal under special conditions, so in general the star point will move to accommodate this. With these connections, the diodes form a standard three-phase bridge, so, again, a standard component module optionally is used.

Those skilled in the art will recognize that for phase numbers above three, corresponding ring and radial circuits are also possible.

In general, phase-controlled devices, such as thyristors or other silicon-controlled rectifiers, could be used to replace some or all of the diodes to give a further degree of control. While such a system would still not require rotor position information (since the devices would turn off when the current crossed zero), it would introduce a complexity which runs counter to the simplicity of embodiments of the invention.

In operation, it is assumed that the prime mover will spin the generator at some appropriate speed. In one embodiment of starting generating action, the control system causes the appropriate level of current to flow in the bias winding. Current is then generated onto the DC link, the amount of power transferred being controlled by adjusting the speed of the machine and/or the magnitude of the bias current. Those skilled in the art will appreciate that conventional feedback methods optionally are used to control the output. Other embodiments use modulation of the DC link.

The descriptions above have been on the basis of a controlled unidirectional bias current $I_b$. This is likely to be the most useful embodiment of the invention, though it should be noted that it is possible to operate with uncontrolled or alternating bias current. The profile of the phase flux-linkage will have a superimposed modulation which, depending on the length of the period of the alternating bias current compared with the period of the inductance cycle of the variable reluctance machine, will result in a corresponding modulation of the generated current. For the special case of the period of the bias current corresponding to the period of the phase flux linkage, there is an opportunity to reduce the number of diodes in the circuit, though this benefit is likely to be offset by the complexity of synchronizing the two frequencies.

While the circuits of FIGS. 9, 10, 12 & 16 have dispensed with the active switches used in the motoring mode, it will be clear that if they are retained the system optionally is operated as a generator both according to embodiments of the invention and in a conventional switching mode without any re-configuration of the power converter.

The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above.

What is claimed is:

1. A method of operating a variable reluctance machine as a generator, the machine having a rotor and at least one phase winding, the method comprising:
    creating a bias flux that varies with rotor position and that links the at least one phase winding; and
    limiting the phase voltage to a magnitude below that otherwise induced in the phase winding by the bias flux.

2. A method as claimed in claim 1 further including restricting the flow of current in the at least one phase winding to one direction.

3. A method as claimed in claim 2 further including restricting the flow of current by at least one diode which also serves to limit the phase voltage.

4. A method as claimed in claim 3 in which the diode is part of a full-wave rectifier circuit.

5. A method as claimed in claim 1 further including causing the phase current to flow through a resistor.

6. A method as claimed in claim 1 further including controlling an electrical output of the machine by controlling the bias flux.

7. A method as claimed in claim 1 further including creating the bias flux linking the at least one phase winding with a bias coil or coils.

8. A method as claimed in claim 7 in which the machine is polyphase and the bias coil(s) is/are arranged to couple with a proportion of the phase windings of the machine.

9. A method as claimed in claim 7 in which the bias flux is produced by a constant current in the or each bias coil.

10. A method as claimed in claim 7 in which the bias flux is produced by an alternating current in the or each bias coil.

11. A method as claimed in claim 1 wherein the machine is connected to a power converter circuit.

12. A method as claimed in claim 11 in which the power converter circuit is free of active switches.

13. A method as claimed in claim 11 in which the power converter circuit includes active switches which are kept open while the variable reluctance machine is operated as a generator.

14. A method as claimed in claim 1 including controlling output power of the machine by controlling the speed of the machine.

15. A method as claimed in claim 1 including controlling output power of the machine by adjusting the magnitude to which the phase voltage is limited.

16. A variable reluctance machine comprising:
    a first part with at least one phase winding;
    a second part which is arranged to move relative to the first part to generate electrical power;
    means for creating a bias flux that varies with the position of the second part relative to the first part, and that links the at least one phase winding; and
    means for limiting the magnitude of the phase voltage below that otherwise induced in the at least one phase winding by the bias flux.

17. A machine as claimed in claim 16 including means for restricting the flow of current in the at least one phase winding to one direction.

18. A machine as claimed in claim 17 in which the means for restricting and the means for limiting collectively comprise at least one diode.

19. A machine as claimed in claim 18 in which the at least one diode is serially connected with the at least one phase winding.

20. A machine as claimed in claim 19 in which the at least one diode is part of a full-wave rectifier circuit.

21. A machine as claimed in claim 16 in which the means for creating a bias flux comprises at least one bias coil.

22. A machine as claimed in claim 21 in which the machine is polyphase and the bias coil is arranged to couple with a proportion of the phases.

23. A machine as claimed in claim 21 including a constant current source connected to excite the at least one bias coil.

24. A machine as claimed in claim 21 including an alternating current source connected to the at least one bias coil.

25. A machine as claimed in claim 16 connected to a power converter circuit.

26. A machine as claimed in claim 25 in which the machine is a generator and in which the power converter is free of active switches.

27. A machine as claimed in claim 16 in which the machine is a generator and includes a resistive load connected across the or each phase winding.

28. A machine as claimed in claim 16,
wherein said movement of said second part relative to said first part is rotational movement about an axis;
wherein said first part has a plurality of said phase windings, and has a plurality of poles that are spaced angularly about said axis, each said phase winding having a portion that is wound around at least one of said poles; and
wherein said means for creating a bias flux includes a bias coil having plural portions that are each wound around a respective one of said poles.

29. A machine as claimed in claim 16,
wherein said movement of said second part relative to said first part is rotational movement about an axis; and
wherein said means for creating a bias flux includes a bias coil stationarily supported on said first part and having a loop with first and second portions on opposite sides of the loop, said first and second portions being disposed on diametrically opposite sides of said first part and each extending approximately parallel to said axis.

30. A machine as claimed in claim 29 wherein said first part has a plurality of said phase windings, and has a plurality of poles that are spaced angularly about said axis, each said phase winding having a portion that is wound around at least one of said poles.

31. A method comprising operating as a generator a variable reluctance machine having a stator that defines stator poles, having a rotor that is rotatable relative to the stator and that defines rotor poles, and having at least one phase winding arranged in relation to the stator poles for generating a phase voltage output, excitation of the phase winding driving flux around a magnetic circuit having a reluctance that varies as a function of rotor position, said operating as a generator including:
creating a bias flux around said magnetic circuit; and
limiting the phase voltage to a magnitude below that otherwise induced in the phase winding by the bias flux.

* * * * *